F. J. HUMEL.
DRY CELL.
APPLICATION FILED OCT. 14, 1911.

1,015,317.

Patented Jan. 23, 1912.

Witnesses.
E. B. Gilchrist
H. C. Sullivan

Inventor.
Frank J. Humel
By Thurston & Kwis
Attorney

UNITED STATES PATENT OFFICE.

FRANK J. HUMEL, OF CLEVELAND, OHIO, ASSIGNOR TO NATIONAL CARBON COMPANY, OF CLEVELAND, OHIO, A CORPORATION OF NEW JERSEY.

DRY CELL.

1,015,317.  Specification of Letters Patent.  Patented Jan. 23, 1912.

Application filed October 14, 1911. Serial No. 654,585.

*To all whom it may concern:*

Be it known that I, FRANK J. HUMEL, a citizen of the United States, residing at Cleveland, in the county of Cuyahoga and State of Ohio, have invented a certain new and useful Improvement in Dry Cells, of which the following is a full, clear, and exact description.

The invention relates to the type of dry cells in which the battery mix, in a dry condition is packed around a hollow perforated carbon electrode in a zinc cup which has a bibulous lining. These cells are inactive, when made, and are rendered active by pouring water into the hollow carbon electrode. This water passes through the perforations in said electrode, into the mix; the expectation being that this water will, in time, moisten the mix and the bibulous lining, and dissolve and render active the salts in the mix which serve as the active part of the electrolyte. Such cells in the form in which they have heretofore been put on the market are not altogether satisfactory, because, when water is poured into the perforated carbon electrode, it will, as it runs through the perforations therein, tend to fall by gravity through the mix to the bottom of the cell. The mix adjacent to the said electrode. and at the bottom of the cell will be quickly moistened; but it always takes a long time to satisfactorily moisten the bibulous lining and the mix adjacent thereto, which is, of course, objectionable. In many cases, the bibulous lining and entire mix are never made uniformly moist, which decreases the efficiency and life of the cell; and in some cases, the bibulous lining and mix adjacent thereto are never rendered moist enough to cause any satisfactory operation of the cell.

The object of this invention is to secure the speedier and more uniform moistening of the entire mix and the cell lining.

The invention consists in arranging within the mix shelves, preferably in the form of disks which extend outward from the perforated electrode toward the cell lining,— said shelves being made of porous, absorbent or cellular material, such as will allow free diffusion of the electrolyte through the mix, but which will nevertheless direct the water outward through the mix and toward the cell lining.

Figure 1:
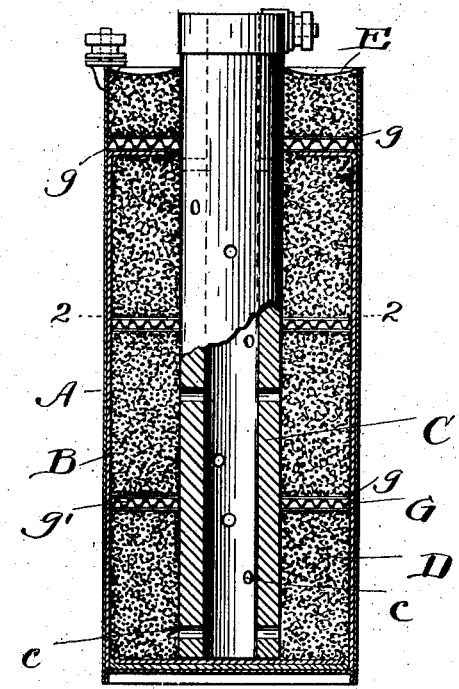
Figure 2:
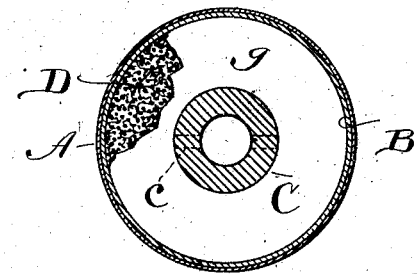

In the drawings, Figure 1 is a vertical central section of a dry cell embodying this invention; and Fig. 2 is a horizontal section in the plane indicated by line 2—2 on Fig. 1, a portion of the disk G being broken away to show the battery mix.

Referring to the parts by letters, A represents the usual zinc cup; B the bibulous lining thereof; C the hollow perforated carbon electrode; D the battery mix which is packed in said lined cup around the electrode C; and E the seal. All of these parts in construction, composition and arrangement are of the ordinary sort.

G, G represent disks which are fitted around the carbon electrode and extend outward therefrom close to the cell lining. These disks are buried and packed in the mix shown; and there may be any number of them. They must be made of some porous, absorbent or cellular material, so as to permit the free diffusion of the electrolyte; but they should be made of such material as will not immediately absorb all of the water, but will on the contrary act as shelves along which the water, which comes through the perforations, c, will flow outward toward the walls of the cup and the lining thereof. In the particular construction shown these disks are made of what is known as corrugated straw board,—comprising two flat strawboard disks g, g, and an intervening corrugated disk g'.

Having described my invention, I claim:

1. A dry cell comprising a lined cup, a hollow perforated electrode, battery mix packed in said lined cup around the electrode, and shelves of porous material which are buried in the battery mix, and extend from the perforated electrode outward toward the cell lining.

2. A dry cell comprising a lined cup, a hollow perforated electrode, battery mix packed in said lined cup around the electrode, and disks of porous material fitted around the perforated electrode and buried in said mix, and extending therein toward the cell lining.

In testimony whereof, I hereunto affix my signature in the presence of two witnesses.

FRANK J. HUMEL.

Witnesses:
RICHARD H. HARVEY,
L. O. BROOKS.